United States Patent
Lindvall

(10) Patent No.: US 6,851,390 B2
(45) Date of Patent: Feb. 8, 2005

(54) ANIMAL BOX WITH DETECTING MEANS

(76) Inventor: Tommy Lindvall, Kvie Ekeby, S-621 70 Visby (SE)

( * ) Notice: Subject to any disclaimer, the term of this patent is extended or adjusted under 35 U.S.C. 154(b) by 0 days.

(21) Appl. No.: 10/432,251

(22) PCT Filed: Nov. 26, 2001

(86) PCT No.: PCT/SE01/02613

§ 371 (c)(1),
(2), (4) Date: May 22, 2003

(87) PCT Pub. No.: WO02/43472

PCT Pub. Date: Jun. 6, 2002

(65) Prior Publication Data

US 2004/0040517 A1 Mar. 4, 2004

(30) Foreign Application Priority Data

Nov. 30, 2000 (SE) .............................. 0004416

(51) Int. Cl.$^7$ ................................ A01K 1/00
(52) U.S. Cl. ..................................... 119/502
(58) Field of Search ................ 119/502, 700, 119/843, 845, 57.7, 70, 342, 447, 458, 703

(56) References Cited

U.S. PATENT DOCUMENTS

| | | | | |
|---|---|---|---|---|
| 543,393 A | * | 7/1895 | Mead | 119/845 |
| 1,247,114 A | * | 11/1917 | Howard | 119/845 |
| 2,969,768 A | * | 1/1961 | Grant | 119/700 |
| 3,167,052 A | * | 1/1965 | Kuhlmann | 119/337 |
| 3,460,515 A | * | 8/1969 | Heide Van Der et al. | 119/14.04 |
| 4,205,628 A | * | 6/1980 | Null | 119/700 |
| 4,423,864 A | * | 1/1984 | Wiik | 472/91 |
| 4,753,255 A | * | 6/1988 | Melin | 134/52 |
| D347,912 S | * | 6/1994 | Golden et al. | D30/160 |
| 5,596,949 A | * | 1/1997 | Fanguy | 119/458 |

FOREIGN PATENT DOCUMENTS

| | | |
|---|---|---|
| DE | 1757360 | 4/1971 |
| EP | 0728413 | 8/1996 |
| SE | 508770 C2 | 11/1998 |

* cited by examiner

Primary Examiner—Michael J. Carone
Assistant Examiner—Brett Hayes
(74) Attorney, Agent, or Firm—Banner & Witcoff, Ltd.

(57) ABSTRACT

A livestock pen with ends and long sides for permanently restricting the freedom of movement of animals kept therein. The livestock pen contains a moving, endless belt that supports all the weight of the animals. The belt is arranged to move from an inlet end towards an outlet end. An outlet end panel forms a gap between the belt and the outlet end panel's lowermost transverse member. At the belt's outlet end, a sensing means, when actuated, stops any ongoing belt movement. An additional aspect relates to a method for stopping the movement of an endless belt in a livestock pen, whereby a sensing means registers when a part of an animal is in a restricted area of the livestock pen. A signal from the sensing means then stops the belt's drive mechanism.

16 Claims, 2 Drawing Sheets

ANIMAL BOX WITH DETECTING MEANS

FIELD OF INVENTION

The present invention relates to livestock pens for holding livestock comprising a floor in the form of an intermittently moving endless belt on which the animals stand.

DESCRIPTION OF THE BACKGROUND ART

A livestock pen for holding livestock is previously known to the art from SE patent 9604750-1 (508 770). This livestock pen is equipped with an intermittent endless belt in the pen's longitudinal direction. The belt supports all the weight of the animals and serves as the floor of the pen. Here, the floor is 'replaced' at regular intervals. Dung is then removed from the belt at its outlet end at the same time as dung-free belt is advanced from the belt's inlet end. As the said document teaches, a belt cleaner can be arranged at the outlet end of the belt and a dredger arranged at the belt's inlet end. Dung is transported from the belt, through a horizontal gap between the end of the belt at the end of the pen, down onto a slippery surface from which compressed air forces the dung into a fertiliser channel. This gap is wide enough to admit the leg of an animal, thereby preventing the animal from injuring itself by stepping beyond the end of the belt when the belt is in motion. However, the design is relatively complex and, accordingly, expensive. Nor is it tailored to animals with thick legs, as such legs could get jammed in the gap.

PURPOSE OF THE INVENTION

The purpose of the present invention is to achieve a simplified device for a livestock pen of the aforesaid kind allowing effective removal of dung at the belt's outlet end, is tailored to livestock with both thin legs and thick legs and eliminates the risk of animal parts becoming jammed between the livestock pen's end panel and the belt when the belt is in motion.

SUMMARY OF THE INVENTION

The aforesaid purposes, as set forth in the independent claims 1 and 7, are achieved with the present invention, thereby eliminating the said disadvantages. Appropriate embodiments of the invention are set forth in the dependent claims.

The livestock pen according to the invention is equipped with a sensing means arranged at the belt's outlet end and is devised, when actuated, to stop ongoing belt movement. In the depicted embodiment, the sensing means is devised as a pivoting unit that transforms an essentially horizontal force into an angular motion. Other types of sensing means, such as beams or curtains formed from ultrasonic waves or laser beams which are broken when an animal enters a restricted area, are conceivable within the scope of the present invention. Sensing means in the form of weight-sensitive components which sense a vertical load in the vicinity of the belt's outlet end or in the form of capacitors which sense the presence of animals in a restricted area are also conceivable within the scope of the present invention.

In one embodiment, the belt's movement is continuous, but an embodiment with movement consisting of movement cycles is also advantageous. The scope of the invention encompasses wide variations in the design of the endless belt's movement cycles and in the way these cycles are affected when the sensing means causes the movement to stop.

Here, a timer can be arranged to achieve the said cycles. As an advantageous embodiment, computer control can be arranged for monitoring and processing signals from the sensing device and for programmed control of a 24-hour program with cycles of varying length for movement periods, standstill periods and the duration of cumulative standstills in shutdowns.

BRIEF DESCRIPTION OF THE DRAWINGS

The invention will now be described in greater detail with reference to embodiments and also with reference to the accompanying drawings, in which.

DESCRIPTION OF THE INVENTION

Figure 1:
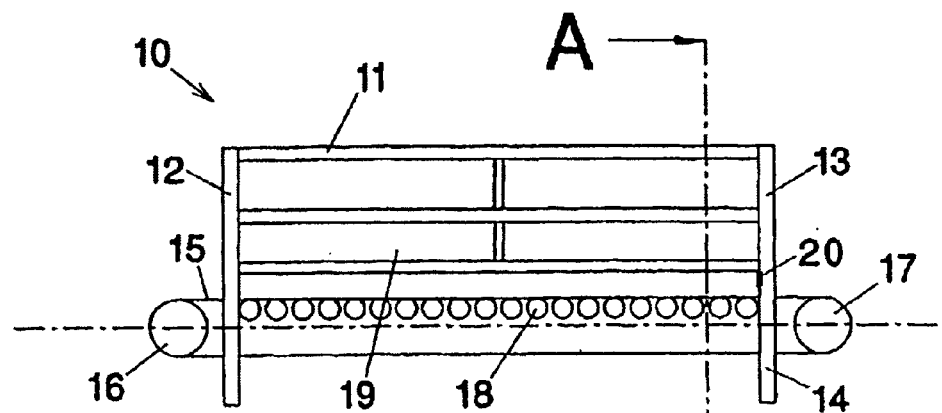
FIG. 1 is a schematically illustrated embodiment of the invention.

FIG. 1 shows a livestock pen 10 equipped with long sides 11, an inlet side 12 and an outlet side 13. The pen is also equipped with adjustable feet 14 which raise the entire pen off the floor, thereby forming a space between the floor and the bottom of the pen. The entire floor of the pen, i.e. the surface on which the animals stand, is formed by an endless belt 15 which runs around a belt idler 16 at the belt's inlet side 12 and a capstan 17 at the belt's outlet side 13. The moving belt 15 is supported by transverse rollers 18, which take up the vertical load, imposed by the weight of the animals, on the belt. The pen also has side walls 19 extending down to the surface of the belt. A sensing means 20 in the form of a pivoting unit is mounted on the outlet side 13. The long sides 11 and the inlet side 12 extend down to the surface of the belt, whereas the outlet side stops above the surface of the belt, forming a gap between the surface of the belt and the outlet side.

Figure 2:
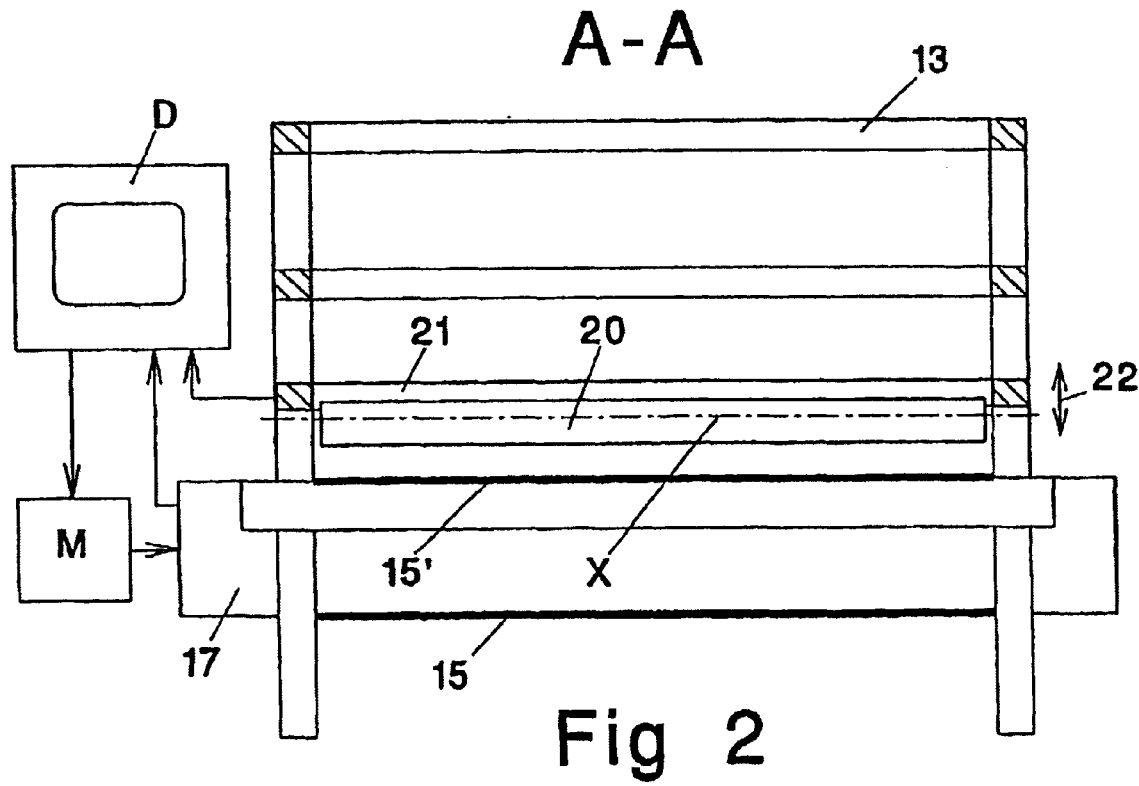
FIG. 2 shows a section through the embodiment in FIG. 1.

FIG. 2 shows a section through the pen shown in FIG. 1. Here, the outlet side 13 is provided with a lower transverse beam 21 on which the sensing device 20 is mounted. The distance between the sensing means and the upper surface of the endless belt's 15 upper part 15' can be regulated, either by changing the vertical position of the transverse beam 21 or changing the vertical position of the sensing means 20 with an adjustment device 22 indicated with a double-headed arrow in the figure. Here, the distance between the lower edge of the sensing device 20 and upper surface of the belt 15' must be large enough to allow all excrement to pass under the lower edge of the sensing means 20.

The sensing means is devised to pivot, from a non-actuated position, around a horizontal axis X from a vertical position up to 30° in the direction of belt movement. When the sensing device 20 is subjected to mechanical force, power to a motor M, arranged to drive the capstan 17 and, accordingly, the belt, is shut off. Power shut-off can be performed by a microswitch, but a somewhat more sophisticated solution is shown in the figure. When actuated here, the sensing device 20 sends a signal to a computer D in which the signal is processed and compared to a minimum signal for the corresponding minimum actuation of the sensing means. If minimum actuation is exceeded, a shut-off signal is sent to the motor and stops it, also causing the belt top stop.

The computer D is also arranged to drive the capstan 17 and accordingly regulate the capstan's speed in a feedback regulatory system, as designated by the arrows in the figure. The computer D also controls the belt's 24-hour cycles by means of a program in which DAY or NIGHT is set at e.g. DAY: 06.00–18.00 and NIGHT: 18.00–06.00 with periods of movement lasting e.g. 3 minutes during which the entire floor (belt) rolls out the way, every 50 minutes. The speed and, accordingly, the duration of the period of movement can be set.

Figure 3:
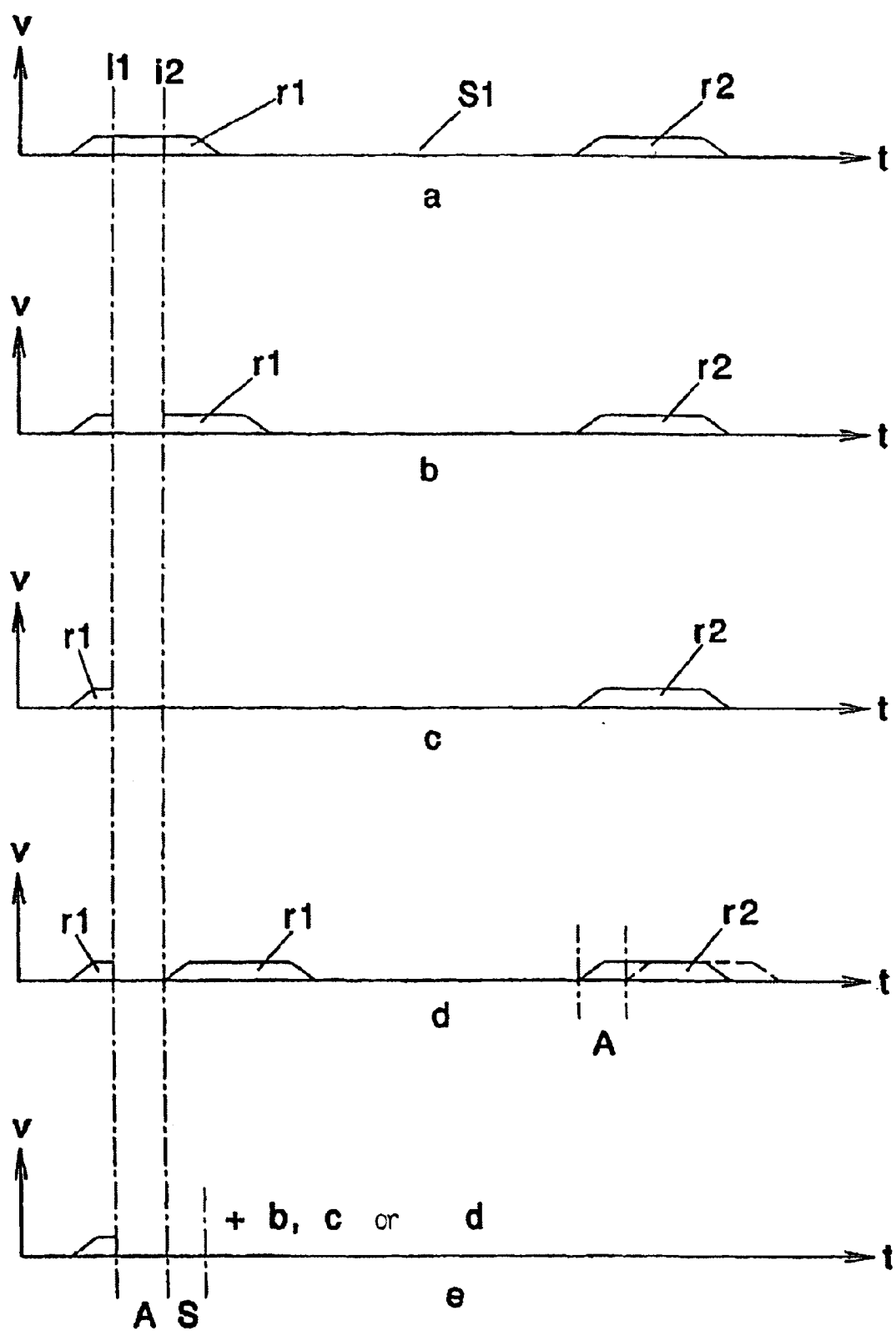
FIGS. 3a–e show diagrams of advantageous cycles in a movement stop.

Moreover, different stop sequences according to FIG. 3 can be selected because the movement pattern is divided into cycles consisting of periods of movement and periods of shut-down. FIG. 3 represents a cycle with two periods of movement r1 and r2 as a part of a 24-hour cycle. The dash-dotted line i1 represents the point in time in the movement period r1 at which the pivoting unit's actuation exceeds the minimum actuation, whereupon belt movement stops completely. The dash-dotted line i2 represents the point in time in the movement period r1 at which the pivoting unit's actuation is less than the minimum actuation, whereupon belt movement restarts. The duration of the shut-down is designated A, so it follows that A=i2−i1. FIGS. 3b–3e describe what happens to the current period of movement r1 in relation to the next consecutive period of movement r2.

FIG. 3b shows that when the pivoting unit's actuation ceases, the belt's interrupted period of motion continues from the point at which it was interrupted at the same time as the duration of next period of movement r2 is unaffected. Thus, the shut-down period between r1 and r2 is shortened and corresponds to the duration of the shut-down A.

FIG. 3c shows that when the pivoting unit's actuation ceases, the belt's interrupted period of movement r1 does not continue. The remaining part of the period of movement is transformed into a shut-down period. Thus, no floor is 'replaced' until the next period of movement r2.

FIG. 3d shows that when the pivoting unit's actuation ceases, the belt's interrupted period of movement r1 restarts from the beginning, whereupon the next period of movement r2 is chronologically advanced to an extent corresponding to the duration of the shut-down A. Thus the shut-down period between r1 and r2 has the same duration as before, but the entire cycle is advanced. Here, programming can automatically reduce displacement in the next cycle before the cycles get back into phase after 3–4 cycles. An alternative to this would be to prevent any chronological advancement of the next period of movement r2.

FIG. 3 illustrates the same cycles as in FIGS. 3b–3d with the difference that an additional shut-down period S is introduced when actuation of the pivoting unit ceases.

Depending on the point at which i1 and i2 occur in a cycle, the computer can be programmed to select one of the described shut-down cycles. If e.g. the entire period of movement occurs during a shut-down, either 3c or 3d can be selected. If only i2 occurs during a shut-down period, one of the alternatives 3b-3d can be selected. If both i1 and i2 occur in the same shut-down period, no cycle is affected whatever. If i1 and i2 occur in two different periods of movement, 3d is selected to achieve complete replacement of the floor.

A shut-down period according to 3e can naturally be added to these selected shut-down cycles.

Optical or acoustic signals may be generated in conjunction with these shut-down cycles in the event of more complex shut-downs.

The shut-down cycles are general for other types of sensing means in embodiments such as curtain of ultrasound or laser beams.

What is claimed is:

1. A livestock pen with ends and long sides for permanently restricting the freedom of movement of animals kept therein, said livestock pen comprising an inlet end, an outlet end having an outlet panel including a transverse member, a moving endless belt which constitutes the entire surface on which the animals stand, said belt moving from said inlet end towards said outlet end during operation, said belt vertically spaced from said outlet end panel such that a gap is formed between said belt and said transverse member of said outlet end panel, and a sensing means arranged at the outlet end of the belt, said sensing means stops ongoing movement of said belt when actuated.

2. The livestock pen according to claim 1, wherein the sensing means is equipped with adjustment means for adjusting the vertical distance to the belt.

3. The livestock pen according to claim 1, wherein the sensing means includes a touch contact that is capable of pivoting around an axis on a plane parallel to the belt.

4. The livestock pen according to claim 3, wherein the axis around which the touch contact pivots on said transverse member of said outlet end panel and above the upper surface of the belt.

5. The livestock pen according to claim 3, wherein said touch contact is arranged for actuation by a mainly horizontal force in stopping movement of the belt.

6. The livestock pen according to claim 1, wherein the movement of said belt is subdivided into cycles consisting of periods of movement and periods of shut-down.

7. A method for stopping the movement of an endless belt arranged as the floor of a livestock pen, said method comprising steps of:

actuating, a sensing means when an animal is in a restricted area of the livestock pen; and stopping said belt in response to a signal from the sensing means.

8. The method according to claim 7, further comprising the step of moving said belt when the animal is again outside the restricted area, and wherein said stopping step ends either immediately after the animal leaves the restricted area or after a shut-down period has been added to a point in time for cessation.

9. The method according to claim 7, wherein the belt moves in cycles consisting of periods of movement and periods of shut-down.

10. The method according to claim 9, wherein a current period of movement continues from a point at which said period of movement was interrupted after shut-down.

11. The method according to claim 9, further comprising the steps of transforming a remaining part of a current period of movement into shut-down time; and continuing said shutdown time until a next consecutive shut-down period.

12. The method according to claim 9, wherein a current period of movement restarts immediately after shut-down.

13. The method according to claim 12, wherein at least one of said cycles is advanced in time by an amount corresponding to a duration of a standstill.

14. The method according to claim 7, wherein a computer monitors and processes signals from the sensing means.

15. The method according to claim 8, wherein a computer monitors and processes signals from the sensing means as well as governs a duration of added standstill time in a shut-down.

16. The method according to claim 14, wherein the computer controls cycles in a 24-hour program comprising movement periods and shut-down periods of varying length.

* * * * *